(12) United States Patent
Locascio, Sr.

(10) Patent No.: US 12,376,513 B1
(45) Date of Patent: Aug. 5, 2025

(54) RELOAD STRING CONTAINER

(71) Applicant: Jessie M. Locascio, Sr., Harahan, LA (US)

(72) Inventor: Jessie M. Locascio, Sr., Harahan, LA (US)

(*) Notice: Subject to any disclaimer, the term of this patent is extended or adjusted under 35 U.S.C. 154(b) by 488 days.

(21) Appl. No.: 17/932,769

(22) Filed: Sep. 16, 2022

Related U.S. Application Data (60) Provisional application No. 63/249,981, filed on Sep. 29, 2021.

(51) Int. Cl.
    *A01G 3/06*     (2006.01)
    *A01D 34/00*     (2006.01)
    *A01D 34/416*     (2006.01)

(52) U.S. Cl.
    CPC .......... *A01D 34/001* (2013.01); *A01D 34/416* (2013.01)

(58) Field of Classification Search
    CPC .............................. A01D 34/001; A01D 34/416
    See application file for complete search history.

(56) References Cited

U.S. PATENT DOCUMENTS

| | | | |
|---|---|---|---|
| 3,402,810 A | 9/1968 | Percelay | |
| 3,512,634 A | 5/1970 | Burch, Jr. | |
| 3,578,199 A * | 5/1971 | Duncan ............... | B65D 81/3886 220/62.19 |
| 3,958,396 A * | 5/1976 | Keiley .................. | A01B 69/00 56/7 |
| 4,033,098 A * | 7/1977 | Green .................. | A01D 34/416 D15/16 |
| 4,193,525 A * | 3/1980 | Sommers ................ | B62J 11/04 224/558 |
| 4,242,855 A * | 1/1981 | Beaver, Jr. ............ | A01D 34/001 56/16.8 |
| 4,338,719 A * | 7/1982 | Burkholder .......... | A01D 34/416 30/276 |
| 4,367,587 A * | 1/1983 | Kilmer ................. | A01D 34/416 30/276 |
| 4,369,577 A * | 1/1983 | Gise .................... | A01D 34/4161 30/276 |
| 5,174,100 A * | 12/1992 | Wassenberg ......... | A01D 34/416 56/DIG. 17 |
| 5,299,720 A | 4/1994 | Koch, III | |
| 5,771,582 A * | 6/1998 | Tuggle ................. | A01D 34/416 43/25 |
| D398,817 S * | 9/1998 | Meisner ............................ | D8/8 |
| 5,816,396 A * | 10/1998 | Shin ....................... | A63B 55/40 206/315.3 |
| 5,901,448 A | 5/1999 | Lingerfelt | |

(Continued)

OTHER PUBLICATIONS

String Trimmer Spare Line Holder, video at https://www.youtube.com/watch?v=9EgWw-KrGOA (screenshot submitted).

*Primary Examiner* — Omar Flores Sanchez (74) *Attorney, Agent, or Firm* — Stone Pigman Walther Wittmann, L.L.C.; Mackenzie D. Rodriguez (57) ABSTRACT

The present invention relates to containers for string for lawn trimming apparatuses. More particularly, the present invention relates to a reload string container which can store multiple, precut portions of string so as to allow a user to quickly reload a lawn trimming apparatus with new string when needed, without having to return to a storage location or without having to attempt to carry extra string on their person.

10 Claims, 7 Drawing Sheets

(56) References Cited

U.S. PATENT DOCUMENTS

| | | | | |
|---|---|---|---|---|
| 6,494,427 | B1 * | 12/2002 | Smith | A01D 34/001 |
| | | | | 224/401 |
| 6,594,972 | B1 * | 7/2003 | Fogle | B65H 49/08 |
| | | | | 53/430 |
| 6,802,173 | B1 | 10/2004 | Fogle | |
| 6,966,168 | B1 | 11/2005 | Kerr, Sr. | |
| D517,315 | S * | 3/2006 | Amin | D3/273 |
| 7,007,442 | B1 | 3/2006 | Fogle | |
| D551,862 | S * | 10/2007 | Gerry | D3/300 |
| 8,690,134 | B1 * | 4/2014 | Saam | A01D 34/001 |
| | | | | 254/131 |
| 8,745,879 | B2 | 6/2014 | Alliss | |
| 9,603,301 | B2 | 3/2017 | Jerez et al. | |
| 9,844,176 | B2 | 12/2017 | Grande | |
| 10,017,321 | B2 * | 7/2018 | Empey | B65D 85/20 |
| 10,064,329 | B1 | 9/2018 | Lovmark | |
| 10,123,477 | B2 | 11/2018 | Biers, Sr. | |
| D869,919 | S * | 12/2019 | Tipton | D8/8 |
| 10,638,663 | B2 | 5/2020 | Grande | |
| 11,291,894 | B2 * | 4/2022 | Payne | A63B 55/10 |
| 2009/0217637 | A1 * | 9/2009 | Dunn | A01D 34/416 |
| | | | | 56/13.6 |
| 2016/0229034 | A1 * | 8/2016 | McPhearson | A01D 34/001 |
| 2021/0045287 | A1 * | 2/2021 | Yarborough | B65H 49/322 |

\* cited by examiner

RELOAD STRING CONTAINER

CROSS-REFERENCE TO RELATED APPLICATIONS

This application claims the benefit of U.S. Provisional Patent Application Ser. No. 63/249,981, filed on 29 Sep. 2021, which is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to containers for string for lawn trimming apparatuses. More particularly, the present invention relates to a reload string container for a lawn trimmer and is especially useful for speed head weed trimmers.

2. General Background of the Invention

Lawn trimmers such as that seen in U.S. Pat. No. 9,433,146, typically use reloadable string for the trimmer apparatus. In order to continue using the trimmer, string must be reloaded periodically, which requires carrying additional string. Currently, this string must be carried by the person using the trimmer or stored at another location causing the person to stop their work and return to the storage location, which is inefficient and time consuming. Thus, there is a need for an improved trimmer apparatus which includes an apparatus for storing replacement string.

The following US Patents are incorporated herein by reference:

U.S. Pat. Nos. 10,638,663; 10,123,477; 10,064,329; 9,844,176; 9,603,301; 8,745,879; 7,007,442; 6,966,168; 6,802,173; 6,594,972; 6,494,427; 5,901,448; 5,299,720; 3,512,634; and 3,402,810.

U.S. Pat. No. 6,494,427 discloses a trimmer line carrier for use with a trimming mower, rather than a weed trimmer. U.S. Pat. No. 6,494,427 includes only a single line rather than one or more entire spools.

U.S. Pat. No. 10,123,477 discloses a string trimmer line holder device. Similar to U.S. Pat. No. 6,494,427, it uses only a single line string rather than an entire spool. Conversely, the present invention allows for continuous feed of multiple spools of string into a speed head weed trimmer.

A string trimmer spare line holder (seen here youtube.com/watch?v=9EgWw-KrG0A) is an attempt to address the issue of running out of string. However, the spare line holder disclosed therein does not protect the string from dirt and grass when the user is working. Additionally, the spare line holder in the video does not hold multiple spools of reload string as can be done in the present invention. There is no need to unravel the string when precut spools are stored in the container. An additional issue that may arise with the string trimmer spare line holder shown in the video is that the shape of the spare line holder is problematic as the protrusions can catch/snag onto other items or clothing when in use.

BRIEF SUMMARY OF THE INVENTION

The apparatus of the present invention is a container for storing replacement string for lawn trimming apparatuses. The container may be of any suitable shape, such as generally a straight cylinder or an elbow-shaped cylinder able to hold one or more spools of replacement string for a lawn trimmer. Preferably, the container can be removably attached to the trimmer handle or shaft for storing string replacement coils while using the trimmer. The container may also have an interior spool for attaching the trimmer string to. Preferably, the container holds more than one spool of replacement string. In some embodiments, the user is able to pull the trimmer string directly from the container to a desired length. In some embodiments, the user is able to remove a precut spool of trimmer string to reload in the speed head weed trimmer.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
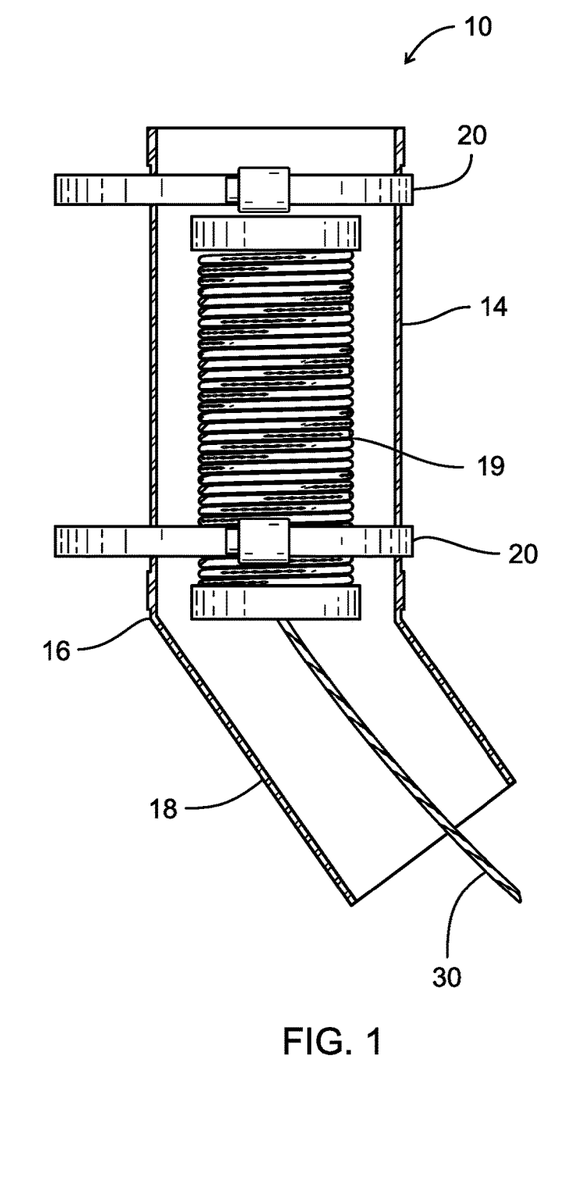
FIG. 1 is a cut-away, side view of a first embodiment of the apparatus of the present invention.

FIG. 1 is a side view showing a first embodiment of the present invention, designated generally by the numeral 10. Preferably, reload string container 10 is generally cylindrical, having an elbow-shape as shown, having a top vertical section 14, a bend or bend section 16, and a bottom angled section 18. Preferably, the size and shape of the container 10 of the present invention allows the container 10 to be attached to a trimmer 40 while in use without the container 10 interfering with normal use of the trimmer 40. In a preferred embodiment: the cylinder has a diameter of approximately 3 inches (7.6 cm); the top, vertical section 14 is approximately 5 inches (12.7 cm) in length; the bottom, angled section is approximately 2 inches (5.1 cm) in length; and the angle of the bottom section 18 is approximately equivalent to the angle of the head 46 of the trimmer. Other suitable sizes and shapes may be used.

Figure 2:
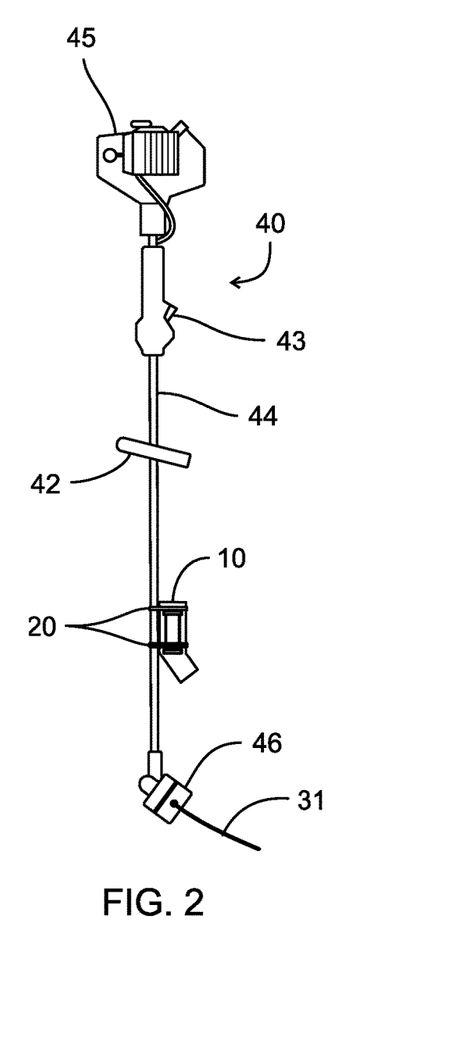
FIG. 2 is a side view of a first embodiment of the apparatus of the present invention as attached to a trimmer apparatus.

FIG. 2 shows the container 10 as attached to a lawn trimmer 40. The present invention can consist of the containers disclosed herein or can comprise the containers disclosed herein and the trimmer to which they are attached. The trimmer 40 generally has a handle 42, a trigger 43, shaft 44, a motor 45 and a trimmer head 46. Preferably, the container 10 can be removably attached to the shaft 44 of the trimmer 40. For example, the container 10 can be removable attached to the shaft 44 using at least two straps 20, as shown. Straps could comprise, for example, commercially available zip ties such as Commercial Electric 11-inch Heat Resistant Cable Tie, available at Home Depot (homedepot.com/p/Commercial-Electric-11-in-Heat-Resistant-Cable-Tie-20-Pack-GT-280STH/315460459). Alternatively, or in addition to zip ties, other straps such as hose clamp metal straps, such as Everbilt 4 in. Galvanized Steel Worm Gear Clamps can be used (homedepot.com/p/Everbilt-4-in-Galvanized-Steel-Worm-Gear-Clamp-MC4HD/203626508).

The container 10 can hold at least one replacement string coil 19, though some embodiments may hold more than one coil 19, preferably up to 10 or more coils 19. Preferably, the coils are precut to the proper length to be inserted into the head of the trimmer 46 so that a user does not have to take the time to measure and cut while on the job. For example, the coils may be cut to 25 feet of string in length. If four spools of 25-foot string are in the container, then the reload container can hold a total of 100 feet of string 30, for example. Thus, although FIG. 1 shows the string coil 19 as a single unitary coil, precut coils such as those coils 119 seen in FIG. 6 can be utilized instead of a single, unitary coil. With precut coils, a user no longer is required to spend time measuring and cutting string as the string is needed. Also, having multiple spools of weed trimmer in the container eliminates unnecessary trips to obtain string refill or a user having to keep string in their pocket. As shown in FIG. 2, once string 30 has been loaded into the trimmer head 46, the string is referenced as trimmer head string 31.

The container 10 of the present invention can be made of any suitable material. For example, the container 10 can be made of plastic. Preferably, the container is made of a material which protects the coils from dirt and debris such as cut grass. Preferably, the container 10 is transparent to allow the user to visualize how much string is left in the container. The straps 20 are preferably of suitable length and width for holding the container 12 tightly to the shaft 44, while not interfering in operation of the trimmer 40. In a preferred embodiment, clamps are used instead of straps 20. Preferably, the straps or clamps are made of any suitable material, such as, for example plastic or metal. In an embodiment, the container is approximately 2.5 inches in length, 8.625 inches in width and 2.5 inches in height. The length can extend. For example, the length can extend to 14.5 inches. Zip ties of any color can be used.

Figure 3:
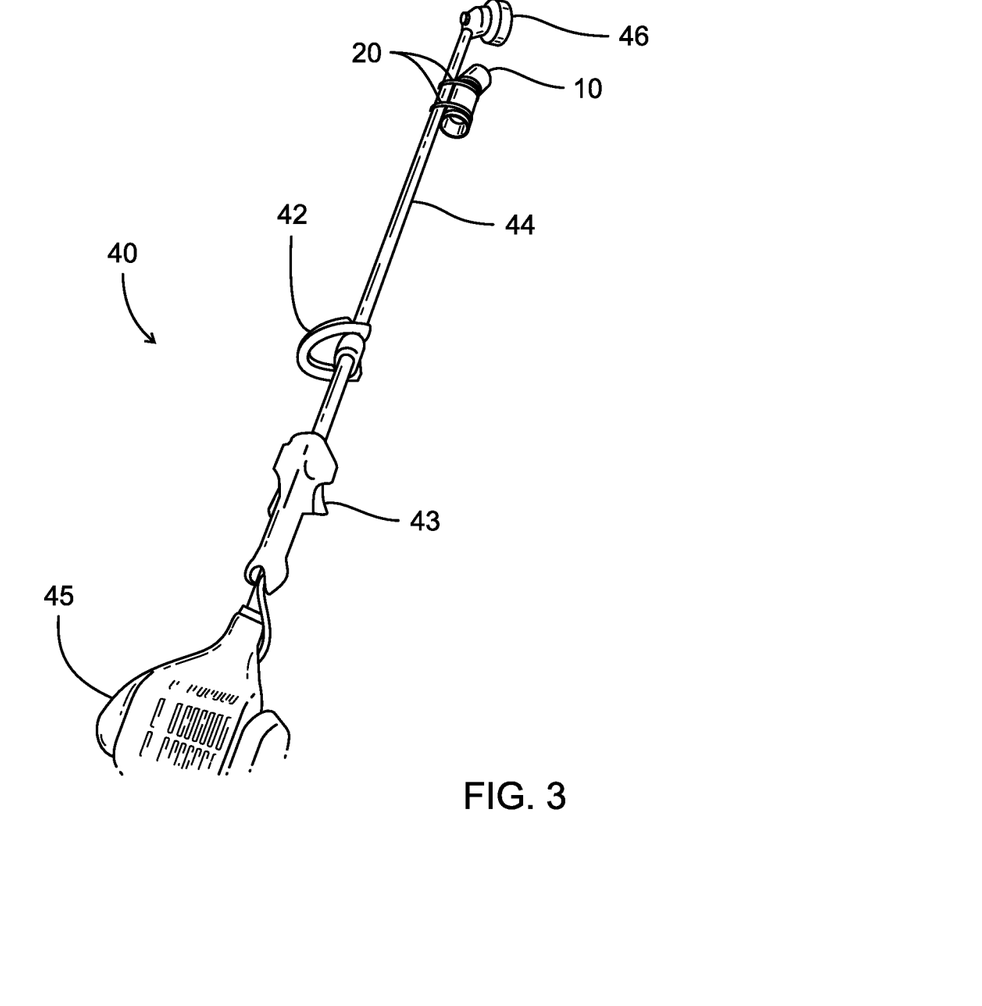
FIG. 3 is a perspective view of a first embodiment of the apparatus of the present invention as attached to a trimmer apparatus.

FIG. 3 is a perspective view of the first embodiment of the present invention 10 as attached to a trimmer 40. As shown, the present invention 10 is storing any suitable number of reload string coils 19 (see FIG. 1). Preferably, 3 to 15 coils are able to be stored in the container 10. However, the present invention can be adapted for use with any typical trimmer 40 and/or string 30 brands or models.

Figure 4:
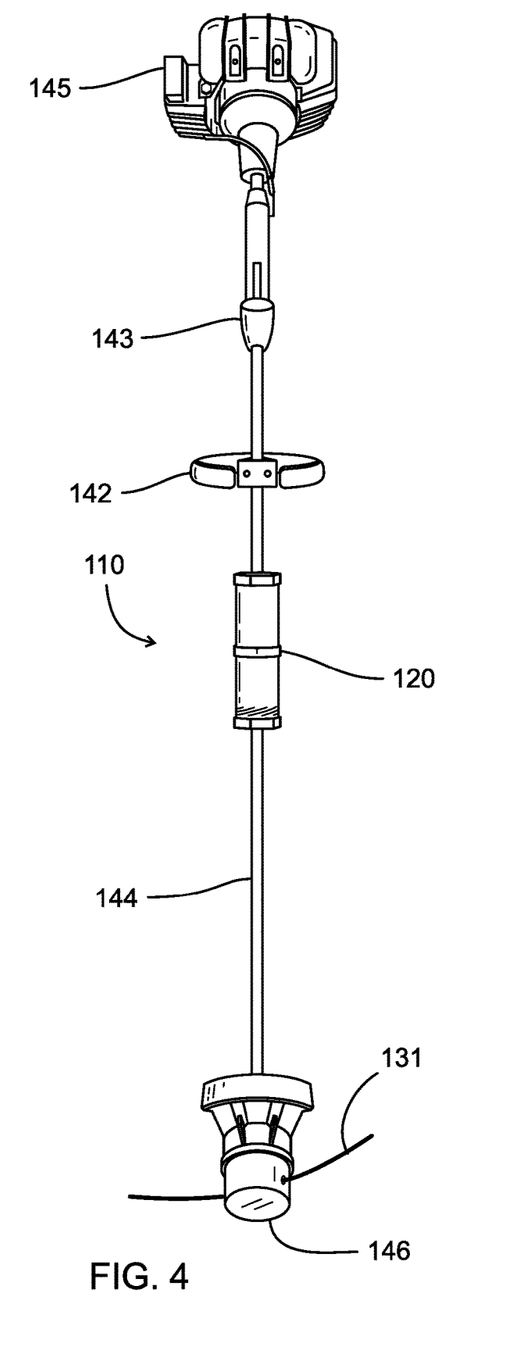
FIG. 4 is a front view of a second embodiment of the apparatus of the present invention in a closed position as attached to a trimmer apparatus.
Figure 5:
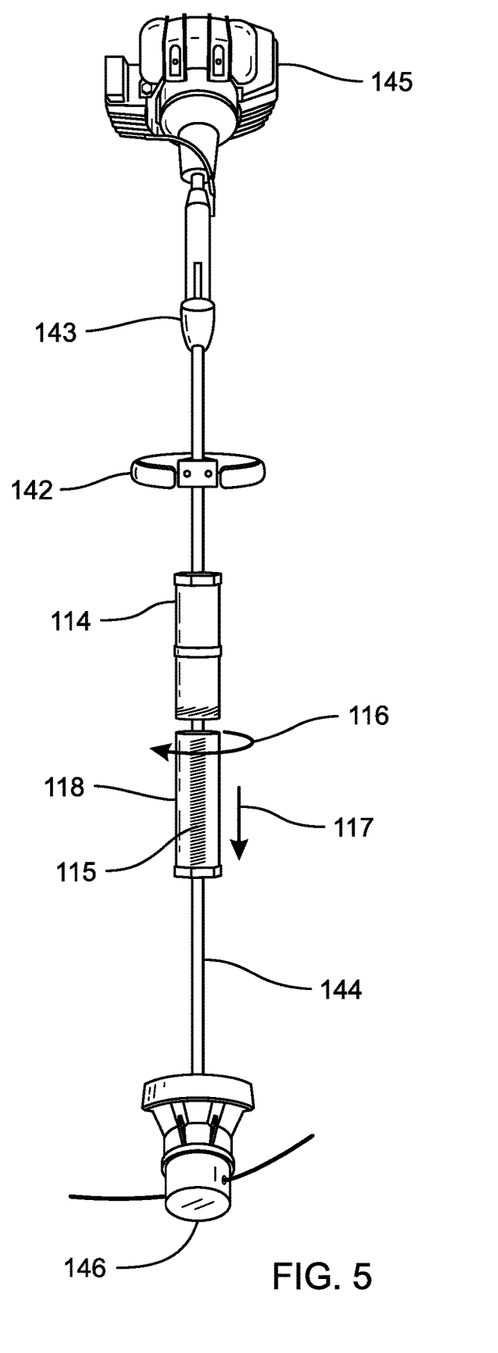
FIG. 5 is a front view of a second embodiment of the apparatus of the present invention in an open position, wherein the bottom section of the apparatus has been removed from the top section and the top section is still attached to a trimmer apparatus.
Figure 6:
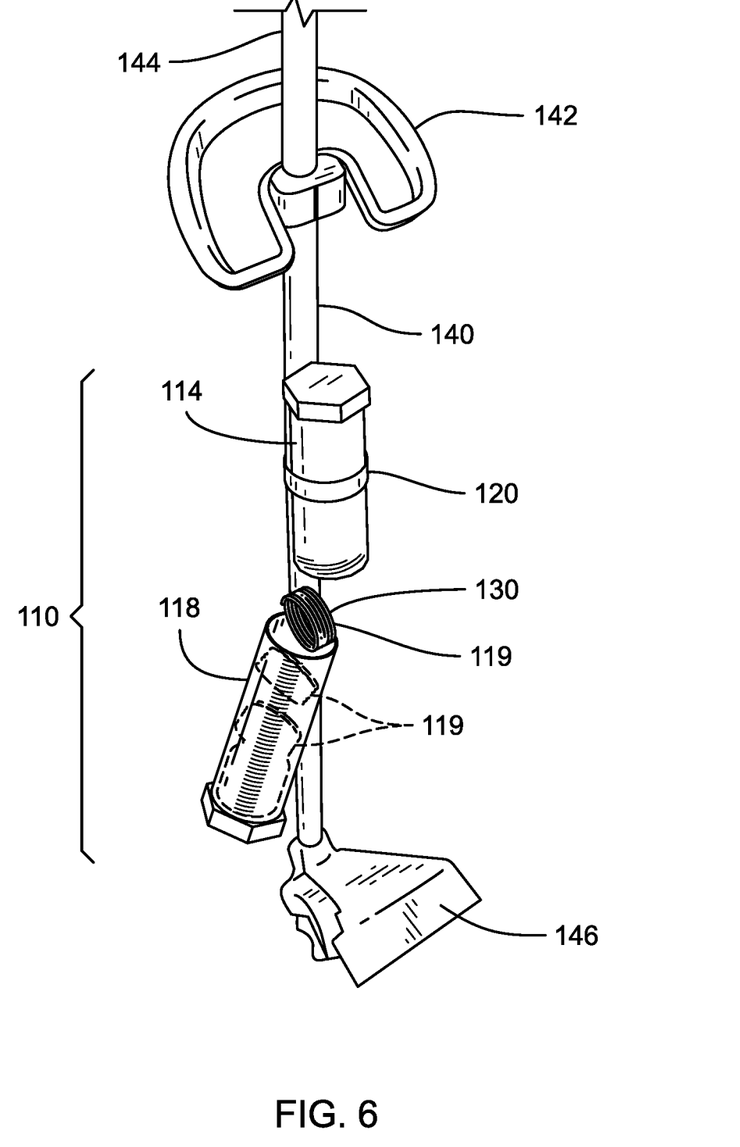
FIG. 6 is a top perspective view of a second embodiment of the apparatus of the present invention in an open position, wherein the bottom section of the apparatus has been removed from the top section and the top section is still attached to a trimmer apparatus.

FIGS. 4-6 show a second embodiment of the apparatus of the present invention, designated generally by the numeral 110. In a second embodiment, the container 110 is a generally straight cylinder. Preferably, the container 110 has a top section 114 that is removably attached a bottom section 118, and wherein the top section 114 is attached to the shaft 144 of the lawn trimmer 140 using one or more straps 120. Preferably, the bottom section 118 can be secured in the top section 114 via grooves 115 (although not shown there would be corresponding internal grooves in the top portion 114 so as to thread external grooves 115 of the bottom portion). Arrow 116 shows rotational direction for removing bottom section 118 from top section 114 when external grooves 115 are present. Arrow 117 shows the movement for removing the bottom section 118 from top section 114 for retrieving or replacing reload string 119 (spindle, spool, or coil). FIG. 6 shows a partial perspective view of the invention 110 as attached to a trimmer 140, wherein the bottom section 118 has been removed as shown by arrows 116, 117 in FIG. 5. As shown in FIG. 6, the present invention 110 can hold multiple spools 119 of reload string 130. In this embodiment, the reload string coils 119 are preferably loaded in the bottom section 118, which is secured to the trimmer 40 by placing it inside the top section 114. This is shown in FIG. 6 showing the container 110 in an open position with the string 130 loaded into the bottom section 118. FIG. 4 shows the container 110 in its closed position, and FIG. 5 shows the container partially opened in a position between that shown in FIG. 4 and that shown in FIG. 6. Preferably, string coils 119 consist of string 130 precut to the proper length for attaching to trimmer head 146.

The attachment means for attaching the container 110 to the trimmer 140 can be any suitable attachment means. For example, straps or clamps as disclosed herein can be utilized.

Preferably the top and bottom containers 114, 118 are made of plastic or any other suitable material. Preferably the material is rigid, water proof, weather tight and rust proof.

Figure 7:
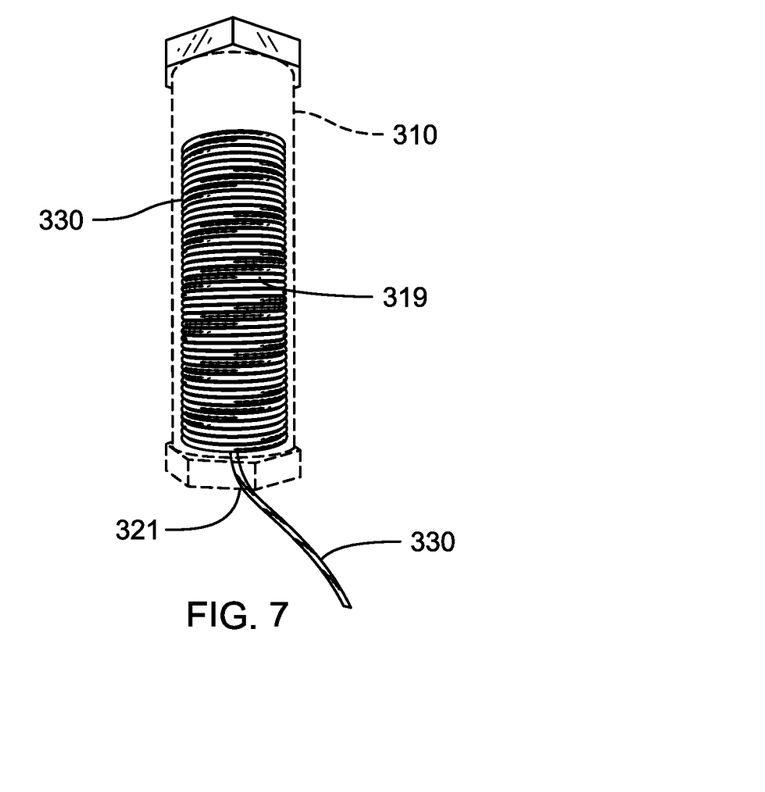
FIG. 7 is a cutaway, side view of an alternate embodiment of the present invention having an interior spool.
Figure 8:
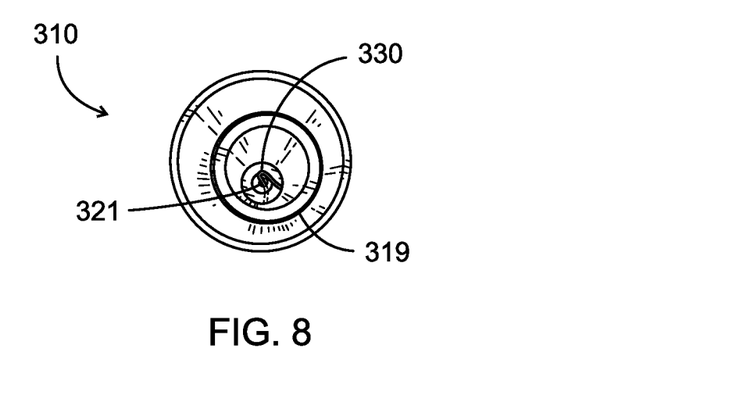
FIG. 8 is a top view of the alternate embodiment of FIG. 7 having an interior spool (top portion of container is removed)
Figure 9:
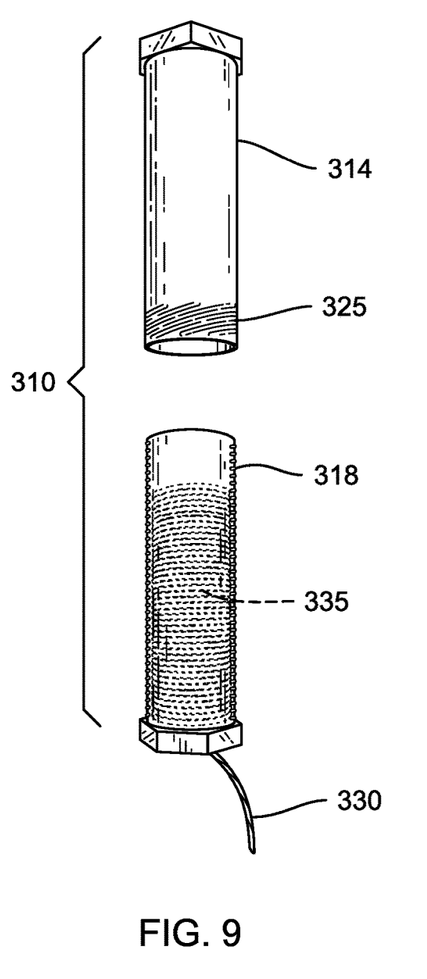
FIG. 9 is an exploded view of an alternate embodiment of the present invention and the interior spool (interior spool is removed)
Figure 10:
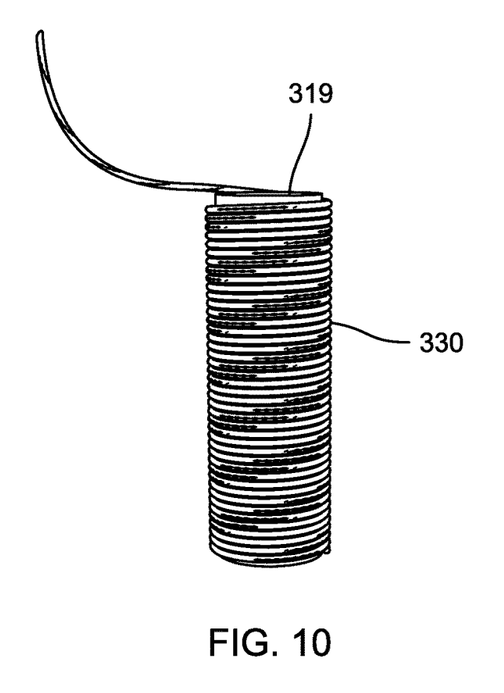
FIG. 10 is a side view of an interior spool of the present invention.

In a third embodiment, set forth in FIGS. 7-10 and designated generally by the numeral 310, the reload string 330 can be fed through an opening 321 at the bottom of the container 310 as shown in FIGS. 7-10, allowing the string 330 from the container 310 of the present invention to be pulled, measured, and cut when replacement string is needed for the trimmer head. FIG. 7 is a cutaway view of a third embodiment, showing spool 319 of string located within the container 310. FIG. 8 is a bottom view of the third embodiment, showing opening 321 located on the bottom portion of container 310, with string 330 exiting from the opening 321. In FIG. 8, the bottom end/cover is shown as transparent as the spool 319 can be seen through the bottom cover/end. FIG. 9 shows the third embodiment container 310 in an open position, with top portion 314 separated from bottom portion 318. Interior grooves 325 of top portion 314 align with exterior grooves 335 on the bottom portion 318 so that the top 314 and bottom 318 portions can be secured together. As seen in FIG. 10, one or more spools 119 comprising string 130 can be loaded into container 310.

In some embodiments, the container 10, 110, 310 can include an interior spindle or spool 119 as shown in FIGS. 7-10 for holding reload string 130.

In some embodiments, the container of the present invention allows a user to pull the string directly from the container to a desired length as needed for trimmer operations. Other embodiments allow the user to remove an entire reload/replacement string spool from the container and install the entire spool on the trimmer head.

Figures 11, 12:
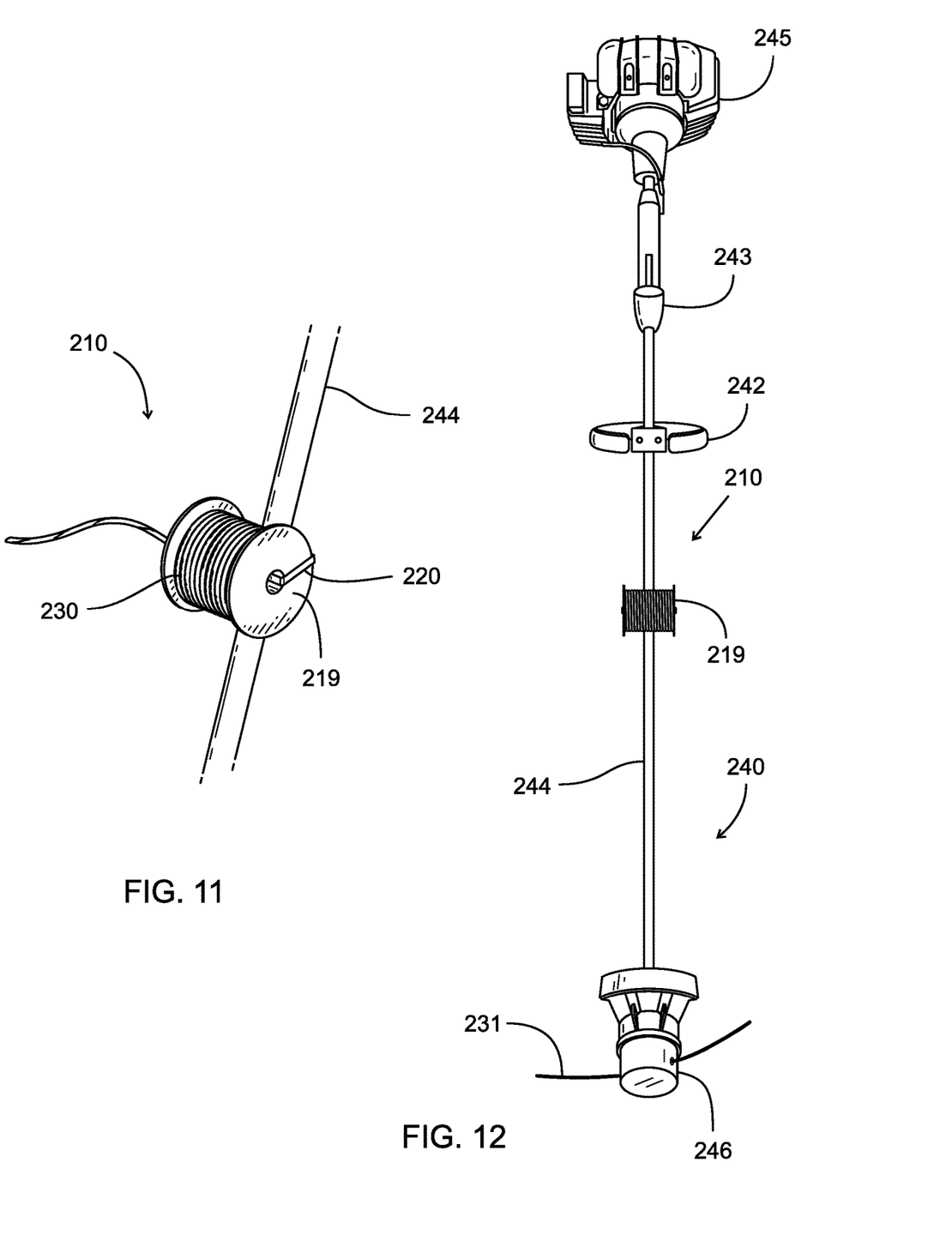
FIG. 11 is a partial side perspective view of an alternative embodiment of the present invention.
FIG. 12 is a front view of the alternative embodiment of FIG. 11 shown as attached to a trimmer apparatus.

In a fourth embodiment 210 as shown in FIGS. 11 and 12, the spool 219 may be attached to the trimmer 240 in a horizontal position, such that the spool 219 Is perpendicular to the pole 244 of the trimmer 240. Preferably the container 210 is attached to the pole 244 via at least one means of attachment which can be, for example, a strap 220. In some embodiments, the string can be fed directly from the side of the spool 219 to the head 46 of the trimmer 40. In some embodiments, the string can be stored in the container 210 and removed for loading into the trimmer 40 when needed. In the fourth embodiment, the string 230 can be pulled to a proper length and cut so as to add to trimmer head 246 as replacement trimmer head string 231. A means for cutting string 230 can be included in the fourth embodiment.

PARTS LIST

The following is a list of parts and materials suitable for use in the present invention:

PARTS NUMBER DESCRIPTION 10 container
14 top, vertical section
16 bend section
18 bottom, angled section
19 string coil
20 strap
30 string
31 trimmer head string
40 lawn trimmer
42 handle
43 trigger
44 shaft/pole
45 motor
46 trimmer head
110 container
114 top section
115 grooves
116 arrow
117 arrow
118 bottom section
119 spindle or spool
120 attachment means
124 top section
125 grooves
128 bottom section
130 string
131 trimmer head string
140 lawn trimmer
142 handle
143 trigger
144 shaft/pole
145 motor
146 trimmer head
210 spool apparatus
219 spindle or spool
220 attachment
230 string
231 trimmer head string
242 handle
243 trigger
244 shaft/pole
245 motor
246 trimmer head
244 shaft
310 container
314 top section
318 bottom section
319 spool
321 opening
325 interior grooves
330 string
335 exterior grooves All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A container for storing replacement string coils for a lawn trimmer apparatus, the container having a generally cylindrical body, the body having a top vertical section, and a bottom vertical section, and the trimmer apparatus having a handle, a shaft, and a head, wherein the container is attached to the shaft of the trimmer using an attachment means, wherein the top section further comprises grooves.

2. The container of claim 1 wherein the attachment means is a strap.

3. A container for storing replacement strings for a lawn trimmer speed trimmer head, wherein the container is transparent, rigid, weatherproof, and sized to hold at least two spools of string precut to fit to the head of a speed trimmer apparatus, wherein the container comprises a top portion and a bottom portion, said bottom portion able to be connected to the top portion in a locking fit.

4. A container for storing replacement strings for a lawn trimmer speed trimmer head, wherein the container is transparent, rigid, weatherproof, and sized to hold at least two spools of string precut to fit to the head of a speed trimmer apparatus, wherein the container comprises a top portion and a bottom portion, the top portion comprising internal grooves and the bottom portion comprising external grooves, the bottom portion having a diameter that is slightly less than the diameter of the top portion, such that the bottom portion can be threaded to the top portion by rotation of the top and bottom portion relative to each other.

5. The container of claim 3 wherein the container further comprises a means to attach said container to a shaft of a weed trimmer apparatus.

6. The container of claim 5 wherein the means to attach comprises one or more zip ties.

7. The container of claim 5 wherein the means to attach comprises one or more clamps.

8. The container of claim 4 wherein the container further comprises a means to attach said container to a shaft of a weed trimmer apparatus.

9. The container of claim 8 wherein the means to attach comprises one or more zip ties.

10. The container of claim 8 wherein the means to attach comprises one or more clamps.

* * * * *